United States Patent
Ryu et al.

(10) Patent No.: US 11,140,649 B2
(45) Date of Patent: Oct. 5, 2021

(54) METHOD AND APPARATUS FOR REPORTING LOCATION INFORMATION OF USER EQUIPMENT IN WIRELESS COMMUNICATION SYSTEM

(71) Applicant: LG ELECTRONICS INC., Seoul (KR)

(72) Inventors: Jinsook Ryu, Seoul (KR); Hyunsook Kim, Seoul (KR); Sangmin Park, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/621,678

(22) PCT Filed: Jun. 12, 2018

(86) PCT No.: PCT/KR2018/006637
§ 371 (c)(1),
(2) Date: Dec. 11, 2019

(87) PCT Pub. No.: WO2018/230928
PCT Pub. Date: Dec. 20, 2018

(65) Prior Publication Data
US 2020/0128507 A1    Apr. 23, 2020

Related U.S. Application Data

(60) Provisional application No. 62/519,156, filed on Jun. 13, 2017.

(51) Int. Cl.
*H04W 64/00* (2009.01)
*H04W 4/029* (2018.01)
(Continued)

(52) U.S. Cl.
CPC ......... *H04W 64/003* (2013.01); *H04W 4/021* (2013.01); *H04W 4/029* (2018.02);
(Continued)

(58) Field of Classification Search
CPC ... H04W 64/003; H04W 4/029; H04W 4/021; H04W 76/27; H04W 76/10; H04W 24/10; H04W 48/16
(Continued)

(56) References Cited

U.S. PATENT DOCUMENTS 9,923,622 B2 * 3/2018 Jactat ............... H04W 36/0055
10,251,147 B2 * 4/2019 Park ..................... H04W 60/06
(Continued)

FOREIGN PATENT DOCUMENTS

CN        1711792      12/2005
CN      101026882       8/2007
(Continued)

OTHER PUBLICATIONS

Qualcomm Incorporated, "23.501-Minimizing the need for PDU session re-establishment due to UE mobility and UPF relocation," SA WG2 Meeting #S2-120, S2-173112, May 2017, 6 pages.
(Continued)

*Primary Examiner* — Mong-Thuy T Tran
(74) *Attorney, Agent, or Firm* — Lee, Hong, Degerman, Kang & Waimey

(57) ABSTRACT

A method for reporting location information of a user equipment (UE) to a network node apparatus by the UE in a wireless communication system may comprise the steps of: receiving information indicating a service area where a data service is provided on the basis of a local area; receiving location change reporting configuration information of a session of the data service; and when the UE enters or leaves the service area while the session of the data
(Continued)

service has been established, reporting information on a location change of the UE on the basis of the location change reporting configuration information.

14 Claims, 13 Drawing Sheets

(51) Int. Cl.
| | |
|---|---|
| *H04W 76/27* | (2018.01) |
| *H04W 76/10* | (2018.01) |
| *H04W 4/021* | (2018.01) |
| *H04W 24/10* | (2009.01) |
| *H04W 48/16* | (2009.01) |

(52) U.S. Cl.
CPC .......... *H04W 24/10* (2013.01); *H04W 48/16* (2013.01); *H04W 76/10* (2018.02); *H04W 76/27* (2018.02)

(58) Field of Classification Search
USPC ........................................................ 370/329
See application file for complete search history.

(56) References Cited

U.S. PATENT DOCUMENTS

| | | | | |
|---|---|---|---|---|
| 10,568,061 | B1* | 2/2020 | Park | H04W 76/22 |
| 10,624,059 | B2* | 4/2020 | Wei | H04W 68/02 |
| 2011/0183682 | A1 | 7/2011 | Harindranath | |
| 2012/0040681 | A1 | 2/2012 | Yan et al. | |
| 2015/0024775 | A1* | 1/2015 | Jung | H04W 64/00 |
| | | | | 455/456.1 |
| 2015/0079945 | A1* | 3/2015 | Rubin | H04W 12/06 |
| | | | | 455/411 |
| 2015/0365789 | A1 | 12/2015 | Salot et al. | |
| 2018/0199306 | A1* | 7/2018 | Edge | G01S 5/10 |
| 2018/0324577 | A1* | 11/2018 | Faccin | H04W 76/27 |
| 2020/0068340 | A1* | 2/2020 | Rasanen | H04W 60/04 |
| 2020/0170055 | A1* | 5/2020 | Dou | H04W 60/005 |

FOREIGN PATENT DOCUMENTS

| | | |
|---|---|---|
| CN | 101262495 | 9/2008 |
| CN | 102984795 | 3/2013 |
| EP | 2613597 | 7/2013 |
| KR | 101405544 | 6/2014 |
| WO | 2013048104 | 4/2013 |
| WO | 2017030348 | 2/2017 |

OTHER PUBLICATIONS

PCT International Application No. PCT/KR2018/006637, Written Opinion of the International Searching Authority dated Sep. 19, 2018, 16 pages.

LG Electronics, et al., "Updates to 'Generic UE Configuration update procedure'," SA WG2 Meeting #121, S2-173381, 5 pages.

3rd Generation Partnership Project (3GPP), "Technical Specification Group Services and System Aspects; System Architecture for the 5G System; Stage 2 (Release 15)," 3GPP TS 23.501 V1.0.0, Jun. 2017, 146 pages.

* cited by examiner (a) UE-P-GW user plane with E-UTRAN (b) Control Plane UE-MME

METHOD AND APPARATUS FOR REPORTING LOCATION INFORMATION OF USER EQUIPMENT IN WIRELESS COMMUNICATION SYSTEM

CROSS-REFERENCE TO RELATED APPLICATIONS

This application is the National Stage filing under 35 U.S.C. 371 of International Application No. PCT/KR2018/006637, filed on Jun. 12, 2018, which claims the benefit of U.S. Provisional Application No. 62/519,156, filed on Jun. 13, 2017, the contents of which are all hereby incorporated by reference herein in their entirety.

TECHNICAL FIELD

The present disclosure relates to a wireless communication system, and more particularly, to a method and apparatus for reporting location information about a user equipment.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

A method for more accurately reporting change in location of a UE when the UE is in an idle mode is required.

The technical problems solved by the present disclosure are not limited to the above technical problems and those skilled in the art may understand other technical problems from the following description.

Technical Solution

In an aspect of the present disclosure, a method for reporting, by a User Equipment (UE), location information about the UE to a network node in a wireless communication system may include receiving information about a service area for providing a data service based on a local area, receiving location change report configuration information for a session of the data service, and reporting information about a location change of the UE based on the location change report configuration information when the UE enters or leaves the service area while the session is established.

In another aspect of the present disclosure, a method for receiving, by a network node, a report on location information about a User Equipment (UE) from the UE in the wireless communication system may include transmitting, to the UE, information about a service area for providing a data service based on a local area, transmitting, to the UE, location change report configuration information for a session of the data service, and receiving a report on information about a location change of the UE based on the location change report configuration information when the UE enters or leaves the service area while the session is established.

In another aspect of the present disclosure, a User Equipment (UE) for reporting location information to a network node in a wireless communication system may include a transmission/reception module, and a processor, wherein the processor may be configured to control the transmission/reception module to receive information about a service area for providing a data service based on a local area, control the transmission/reception module to receive location change report configuration information for a session of the data service, and control the transmission/reception module to report information about a location change of the UE based on the location change report configuration information when the UE enters or leaves the service area while the session is established.

In another aspect of the present disclosure, a network node for receiving a report on location information about a User Equipment (UE) from the UE in the wireless communication system may include a transmission/reception module, and a processor, wherein the processor may be configured to control the transmission/reception module to transmit, to the UE, information about a service area for providing a data service based on a local area, control the transmission/reception module to transmit, to the UE, location change report configuration information for a session of the data service, and control the transmission/reception module to receive a report on information about a location change of the UE based on the location change report configuration information when the UE enters or leaves the service area while the session is established.

In each aspect of the present disclosure, the location change report configuration information may include at least one of interested area information, information about a report condition, or information about a report gap.

In each aspect of the present disclosure, the interested area information may include at least one of a tracking area list and a cell ID list.

In each aspect of the present disclosure, the location change report configuration information may include information about the report gap, wherein the reporting of the location change of the UE may be skipped when the UE enters or leaves the service area for a time set as the report gap.

In each aspect of the present disclosure, the reporting of the location change of the UE may be performed when the UE entering or leaving the service area remains in or out of the service area after the time set as the report gap elapses.

In each aspect of the present disclosure, the information about the location change of the UE may include information about change of an interested area, the interested area varying as a location of the UE changes.

In each aspect of the present disclosure, the data service provided based on the local area may include a Location Area data Network (LADN) service.

In each aspect of the present disclosure, the network node may include an Access and Mobility Function (AMF).

In each aspect of the present disclosure, receiving a session establishment accept message for a session establishment request may be further included, wherein the location change report configuration information may be contained in the session establishment accept message.

In each aspect of the present disclosure, the information about the service area may be received before the session of the data service is established.

Advantageous Effects

According to the present disclosure, a change in location of a UE in the idle mode may be more accurately reported to a network node.

Further, according to the present disclosure, by using the information about a report gap in reporting information about the location change of the UE, the number of times of reporting may be prevented from unnecessarily increasing when the UE moves at a boundary of service areas.

It will be appreciated by persons skilled in the art that the effects achieved by the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
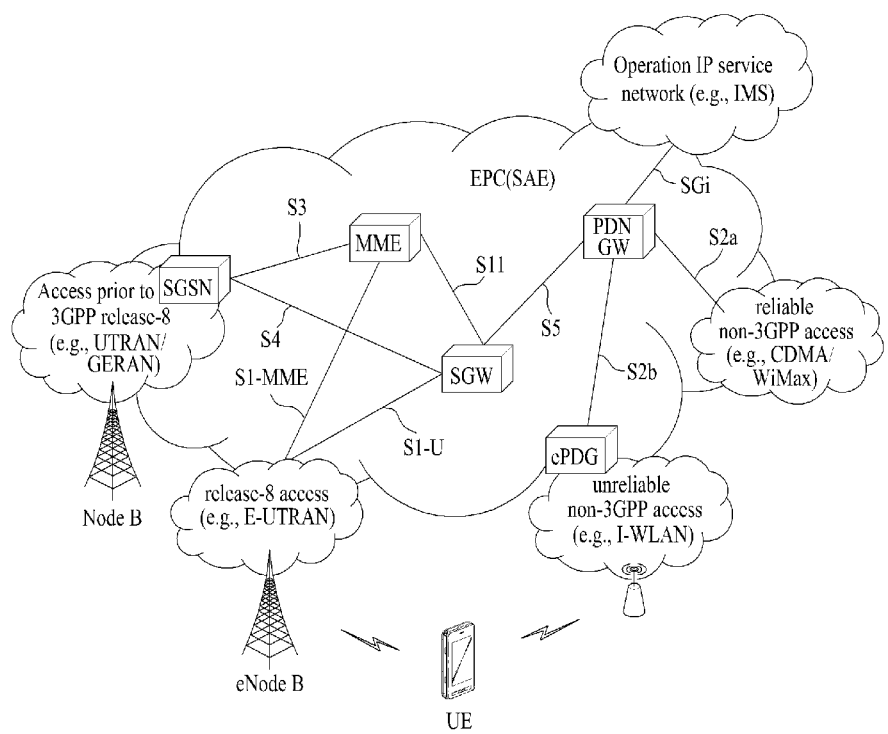
FIG. 1 is a schematic diagram showing the structure of an evolved packet system (EPS) including an evolved packet core (EPC).

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present disclosure described hereinbelow are combinations of elements and features of the present disclosure. The elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

The embodiments of the present disclosure can be supported by standard specifications disclosed for at least one of wireless access systems including an institute of electrical and electronics engineers (IEEE) 802.xx, a 3rd generation partnership project (3GPP) system, a 3GPP Long Term Evolution or New Radio (3GPP LTE/NR) system, and a 3GPP2 system. That is, steps or parts that are not described to clarify the technical features of the present disclosure may be explained with reference to the above standard specifications.

All terms disclosed in this document may be explained by the above standard specifications. For example, this disclosure may be supported by one or more of 3GPP LTE standard specifications of 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, and 3GPP TS 24.301 and/or 3GPP NR standard specifications (e.g., 3GPP TS 38.331 and 3GPP TS 23.501).

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

Specific terms used for the embodiments of the present disclosure are provided to aid in understanding of the present disclosure. These specific terms may be replaced with other terms within the scope and spirit of the present disclosure.

The detailed description, which will be given below with reference to the accompanying drawings, is intended to explain exemplary embodiments of the present disclosure, rather than to represent the only embodiments in which the present disclosure may be practiced.

Specific terms used for the embodiments of the present disclosure are provided to aid in understanding of the present disclosure. These specific terms may be replaced with other terms within the scope and spirit of the present disclosure.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB, or gNB, and an RNC (Radio Network Controller) for controlling the NodeB and the eNodeB in a 3GPP network. The RAN is present between a UE and a core network, and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator. A PLMN may provide service in one frequency band or a combination of frequency bands. As a rule, the PLMN is limited by the borders of a country. According to national regulations, there may be one or more PLMNs per country. A relationship exists between each subscriber and his or her home PLMN (HPLMN). If communications are handled over a PLMN other than the home PLMN of each subscriber, this PLMN is referred to as a visited PLMN (VPLMN).

Access technology: When a UE attempts to select a specific PLMN, the UE uses an access technology (e.g., GSM, UTRAN, GSM COMPACT, E-UTRAN, or NG-RAN) associated with a PLMN to determine a radio carrier type to be searched for.

Camped on a cell: The UE (mobile equipment (ME) if there is no SIM) has completed the cell selection/reselection process and has chosen a cell from which the UE plans to receive available services. The services may be limited and the PLMN may not be aware of the existence of the UE (ME) within the chosen cell.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network. FIG. 1 is a schematic diagram showing the structure of an evolved packet system (EPS) including an evolved packet core (EPC).

gNB: A node that provides NR user plane and control plane protocol terminations towards a UE and is connected to a 5G core network (5GC) via a next generation (NG) interface (e.g., NG-C or NG-U).

5G access network (AN): An AN including an NG RAN and/or a non-3GPP AN connecting to a 5GC.

5G system: A 3GPP system consisting of a 5G AN, a 5GC, and a UE. The 5G system is also called a new radio (NR) system or an NG system.

NGAP UE association: A logical per-UE association between a 5G-AN node and an AMF.

NF service: Functionality exposed by a network function (NF) through a service based interface and consumed by other authorized NFs.

NG-RAN: A radio access network connected to a 5GC in a 5G system.

NG-C: A control plane interface between an NG-RAN and a 5GC.

NG-U: A user plane interface between an NG-RAN and a 5GC.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
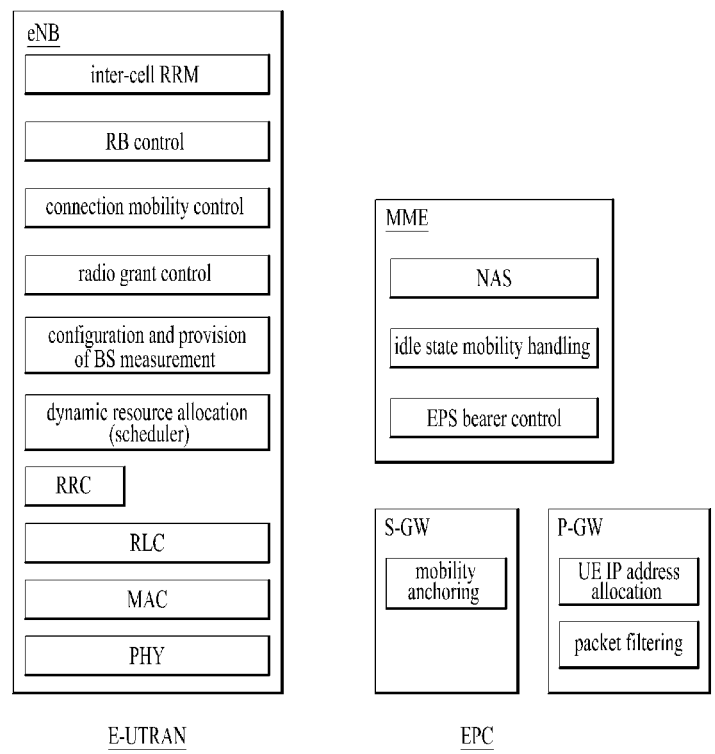
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
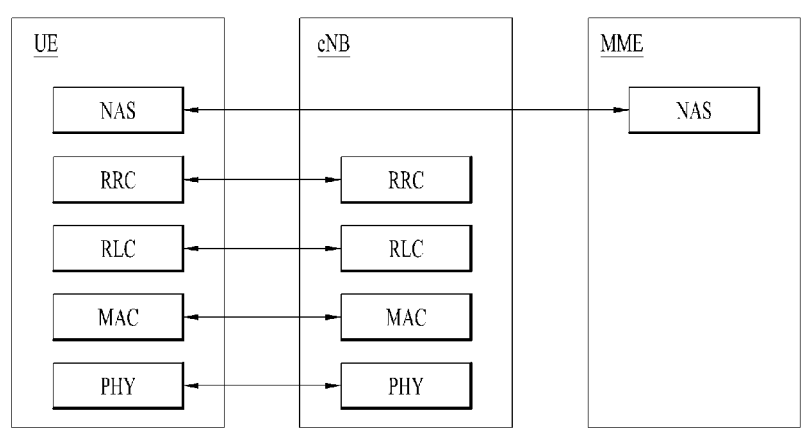
FIG. 3 is a diagram exemplarily illustrating the structure of a radio interface protocol in a control plane.
Figure 4:
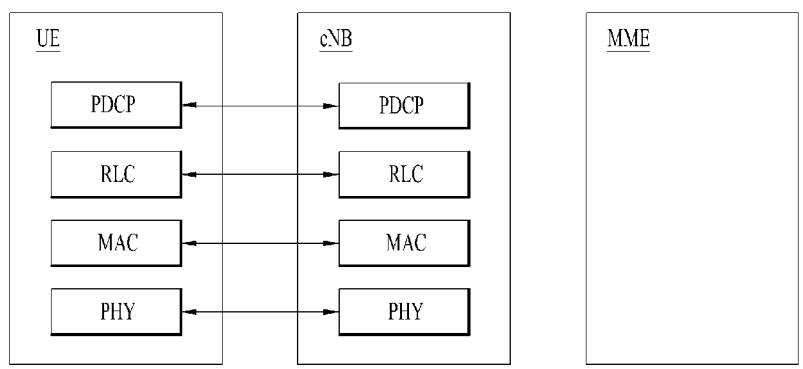
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) | between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer may include a Medium Access Control (MAC) layer, a Radio Link Control (RLC) layer, and a Packet Data Convergence Protocol (PDCP) layer.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The control channel may include a Broadcast Control Channel (BCCH), a Paging Control Channel (PCCH), a Common Control Channel (CCCH), and a Dedicated Control Channel (DCCH). In this case, the BCCH may refer to a downlink channel for broadcasting system control information, and the PCCH may refer to a downlink channel for delivering notification of paging information and system information change. The CCCH may refer to a channel for transmitting control information between the UE and the network, and the DCCH may refer to a point-to-point bidirectional channel for transmitting dedicated control information between the UE and the network. The CCCH may be used for UEs that do not have an RRC connection with the network, and the DCCH may be used for UEs that have an RRC connection.

The traffic channel may include a Dedicated Traffic Channel (DTCH). The DTCH, which is a point-to-point channel dedicated to a single UE to deliver user information, may be present on both uplink and downlink.

As described above, the MAC layer may map various logical channels to various transport channels on downlink and uplink. For example, on downlink, the MAC layer may map the BCCH to a BCH or a Downlink-Shared Channel (DL-SCH), and may map the PCCH to a PCH. In addition, on downlink, the MAC layer may map the CCCH to the DL-SCH, the DCCH to the DL-SCH, and the DTCH to the DL-SCH. In addition, on uplink, the MAC layer may map the CCCH to an Uplink-Shared Channel (UL-SCH), the DCCH to the UL-SCH, and the DTCH to the UL-SCH.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
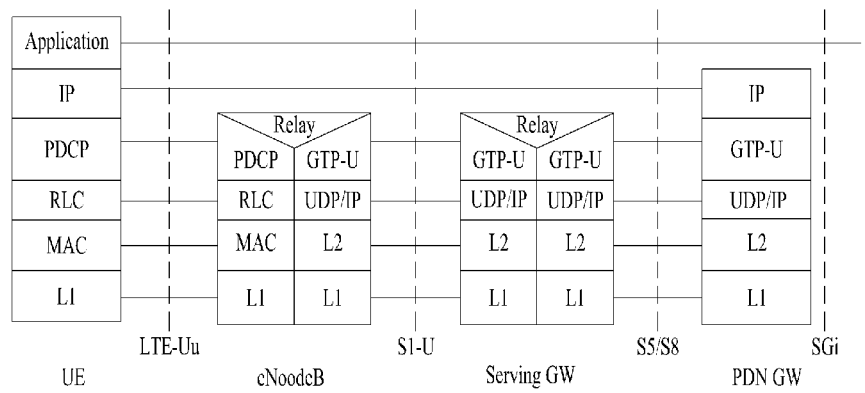
FIG. 5 is a diagram illustrating LTE (Long Term Evolution) protocol stacks for a user plane and a control plane.
Figure 5:
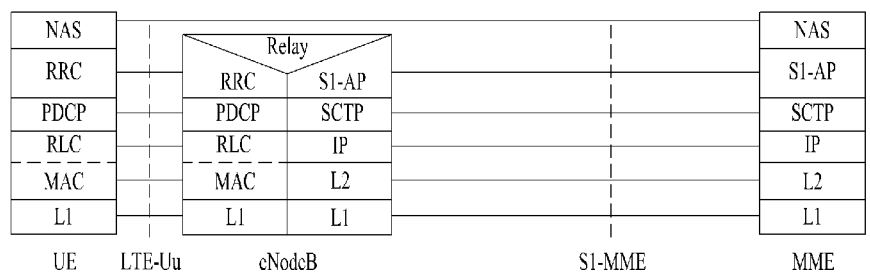

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
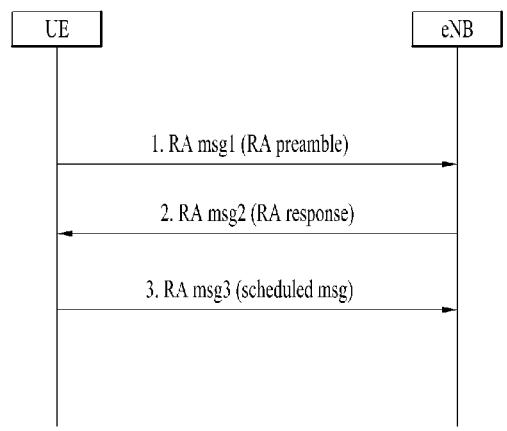
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

(1) Step 1

The UE transmits a randomly selected random access preamble to the eNodeB.

The UE selects a random access preamble from among 64 candidate random access preambles and the UE selects a subframe corresponding to the PRACH configuration index. The UE transmits the selected random access preamble in the selected subframe.

(2) Step 2

Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

(3) Step 3

The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
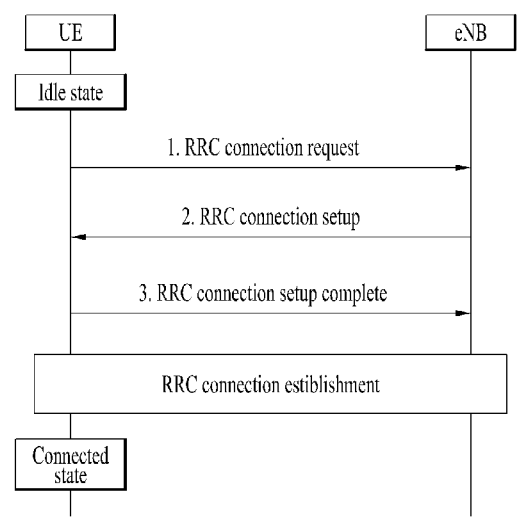
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in RRC_IDLE. Only when the UE staying in the idle state needs to establish RRC connection, does the UE establish RRC connection with the RRC layer of the eNB through the RRC connection procedure and then transition to the RRC_CONNECTED state.

The UE staying in RRC_IDLE needs to establish RRC connection in many cases. For example, the cases may include an attempt of a user to make a phone call, an attempt to transmit data, or transmission of a response message after reception of a paging message from the E-UTRAN.

In order for the UE in RRC_IDLE to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB.

(1) When the UE in RRC_IDLE desires to establish RRC connection for reasons such as an attempt to make a call, a data transmission attempt, or a response of the eNB to paging, the UE transmits an RRC connection request message to the eNB first.

(2) Upon receiving the RRC connection request message from the UE, the eNB accepts the RRC connection request of the UE when the radio resources are sufficient, and then transmits an RRC connection setup message, which is a response message, to the UE.

(3) Upon receiving the RRC connection setup message, the UE transmits an RRC connection setup complete message to the eNB.

Only when the UE successfully transmits the RRC connection setup complete message, does the UE establish RRC connection with the eNB and transition to the RRC_CONNECTED mode.

In current 3GPP, a study on a next-generation mobile communication system after EPC is underway. For design of the next-generation mobile network system, for example, a 5G core network, 3GPP has defined service requirements through the study called services and markets technology enablers (SMARTER). System architecture 2 (SA2) is conducting Study on Architecture for Next Generation System, FS_NextGen, based on the SMARTER. The following terminologies are defined for the next-generation (NextGen) system (NGS) in 3GPP TR 23.799.

Evolved E-UTRA: A RAT representing the evolution of an E-UTRA radio interface for operation in a NextGen system.

Network Capability: A network-provided and 3GPP-specified feature that typically is not used as a separate standalone "end user service", but rather as a component that may be combined into a telecommunication service that is offered to an "end user". For example, a location service is typically not used by an "end user" to simply query the location of another UE. As a feature or network capability, the location service may be used, for example, by a tracking application, which is then offered as the "end user service". The network capability may be used by a network internally and may be exposed to external users, that are also denoted third parties.

Network Function: A network function in TR 23.700 is a 3GPP adopted or 3GPP defined processing function in a network, which has a functional behavior or 3GPP defined interface. Note 3: A network function can be implemented as a network element on dedicated hardware, as a software instance running on dedicated hardware, or as a virtualized function instantiated on an appropriate platform (e.g., on cloud infrastructure).

NextGen Core Network: A core network specified in the present document, that connects to a NextGen access network.

NextGen RAN (NG RAN): A radio access network that supports one or more of the following operations:
(1) Standalone new radio,
(2) Standalone new radio is an anchor with evolved E-UTRA extensions,
(3) Evolved E-UTRA,
(4) Evolved E-UTRA is an anchor with evolved new radio extensions.

NG RAN has common characteristics in that a RAN interfaces with a NextGen core.

NextGen Access Network (NG AN): A NextGen RAN or a non-3GPP access network which interfaces with a NextGen core.

NextGen (NG) System: A NextGen system including an NG AN and a NextGen core.

NextGen UE: A UE connecting to a NextGen system.

PDU Connectivity Service: A service that provides exchange of PDUs between a UE and a data network.

PDU Session: Association between a data network that provides a PDU connectivity service and a UE. The type of the association includes an IP type, an Ethernet type, and a non-IP type. In other words, while a legacy session has been of the IP type, a NextGen session may be distinguished even depending on whether session type is of the Ethernet type or the non-IP type.

PDU Session of IP Type: Association between a UE and an IP data network.

Service Continuity: Uninterrupted user experience of a service including the cases in which an IP address and/or an anchoring point changes.

Session continuity: The continuity of a PDU session. For a PDU session of an IP type, "session continuity" implies that an UP address is preserved for the lifetime of the PDU session.

A 5G system architecture is defined to support data connectivity and services enabling deployments to use techniques such as network function virtualization and software defined networking. The 5G system architecture is defined as service-based and the interaction between network functions is represented in two ways:

(1) A reference point representation: This shows the interaction existing between NF services in the network functions described by point-to-point reference point (e.g., N11) between any two network functions (e.g., AMF and SMF).

(2) A service-based representation: where network functions (e.g., AMF) within the control plane enables other authorized network functions to access their services.

Figure 8:
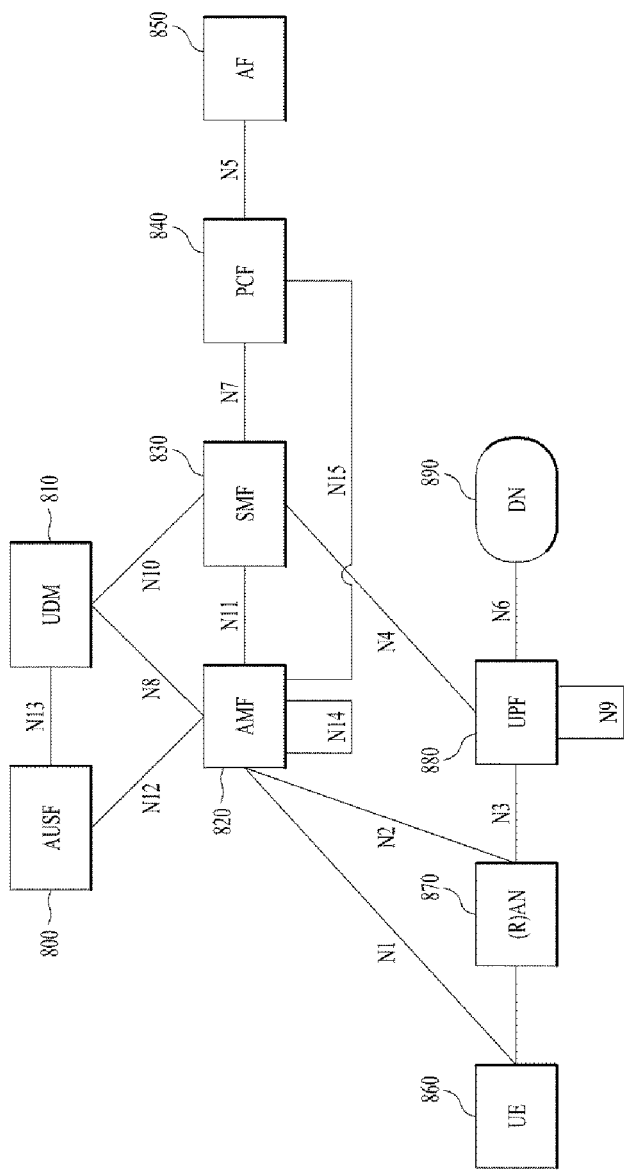
FIG. 8 is a diagram exemplarily illustrating a 5G system architecture using a reference point representation.

FIG. 8 is a diagram exemplarily illustrating a 5G system architecture using a reference point representation.

The 5G system architecture may be composed of various network functions (NF). For example, the 5G system architecture may include an Authentication Server Function (AUSF), a (Core) Access and Mobility Management Function (AMF), a Session Management Function (SMF), a Policy Control Function (PCF), an Application Function (AF), Unified Data Management (UDM), a Data Network (DN), a User Plane Function (UPF), a (Radio) Access Network ((R)AN), and a User Equipment (UE), but is not limited thereto.

In addition, in 3GPP, a conceptual link connecting between NFs in a 5G system is defined as a reference point. Examples of reference points included in the 5G system architecture are listed below.

N1: a reference point between the UE and the AMF
N2: a reference point between the (R)AN and the AMF
N3: a reference point between the (R)AN and the UPF
N4: a reference point between the SMF and the UPF
N5: a reference point between the PCF and the AF
N6: a reference point between the UPF and the DN
N7: a reference point between the SMF and the PCF
N7r: a reference point between the PCF in a visited network and the PCF in a home network
N8: a reference point between the UDM and the AMF
N9: a reference point between two core UPFs
N10: a reference point between the UDM and the SMF
N11: a reference point between the AMF and the SMF
N12: a reference point between the AMF and the AUSF
N13: a reference point between the UDM and an Authentication Server Function (AUSF)
N14: a reference point between two AMFs
N15: a reference point between the PCF and the AMF in a non-roaming scenario, a reference point between the PCF and the AMF in the visited network in a roaming scenario
N16: a reference point between two SMFs (a reference point between the SMF in a visited network and the SMF in a home network in the roaming scenario)
N17: a reference point between the AMF and an Equipment Identity Register (EIR)
N18: a reference point between any NF and the UDSF
N19: a reference point between the NEF and the SDSF For definitions and more detailed descriptions of the terms related to the 5G system architecture, see 3GPP TR 21.905 and 3GPP TS 23.501.

Hereinafter, the function of each NF will be described with reference to FIG. 8.

Referring to FIG. 8, an AUSF 800 stores data for authentication of a UE 860.

The UDM 810 stores subscription data about the user, policy data, and the like. The UDM 810 includes two parts: an application Front End (FE) and a User Data Repository (UDR).

The FE includes an FE of the UDM, which is responsible for location management, subscription management, and credential processing, and a PCF that is responsible for policy control. The UDR stores data required for the functions provided by the UDM-FE and a policy profile required by the PCF. The data stored in the UDR includes user subscription data, which includes a subscription identifier, a security credential, a subscription data related to access and mobility, and session-related subscription data, and policy data. The UDM-FE accesses the subscription information stored in the UDR and supports functions such as authentication credential processing, user identification handling, access authentication, registration/mobility management, subscription management, and SMS Management.

The AMF 820 may include functionality such as, for example, termination of the RAN CP interface (i.e., the N2 interface), termination of the NAS (N1), NAS signaling security (NAS ciphering and integrity protection), connection management, reachability management, AS security control, registration management (registration area management), connection management, idle mode UE reachability (including control and execution of paging retransmission), mobility management, support for intra-system mobility and inter-system mobility, support for network slicing, SMF selection, lawful intercept (for an AMF event and an interface to the LI system), transport of a session management (SM) message between the UE 860 and the SMF 830, a transparent proxy for SM message rotting, access authentication, access authorization including roaming authority checks, transport of an SMS message between the UE 860 and the SMF 830, a Security Anchor Function (SEA), Security Context Management (SCM), and EPS bearer ID allocation for interworking with the EPS. Some or all of the functions of the AMF 820 may be supported within a single instance of one AMF 820.

The SMF 830 may provide a session management function. When the UE 860 has a plurality of sessions, each session may be managed by a different SMF.

Specifically, SMF 830 may support functions such as session management (e.g., establishment, modification, and release of a session, including maintenance of a tunnel between the UPF 880 and an AN node), and allocation and management (optionally including authentication) of an IP address of the UE 860, selection and control of a UP function, traffic steering configuration for routing traffic from the UPF 880 to an appropriate destination, termination of an interface towards policy control functions, enforcement of a control part of the policy and QoS, lawful intercept (for an SM event and an interface to the LI systems), termination of an SM part of a NAS message, downlink data notification, an initiator of AN-specific SM information (transported to AN through N2 via the AMF 820), determination of a Session and Service Continuity (SSC) mode of a session, and roaming.

Some or all of the functions of the SMF 830 may be supported within a single instance of one SMF.

The PCF 840 may receive information about a packet flow from an application server and provide a function of determining policies such as mobility management and session management. Specifically, the PCF 840 may support functions such as support for a unified policy framework for controlling a network operation, provision of policy rules to allow CP function(s) (e.g., the AMF 820, the SMF 830, etc.) to enforce the policy rules, and implementation of an FE to access related subscription information for determination of a policy in the User Data Repository (UDR).

The AF 850 may interwork with the 3GPP core network for service provision (e.g., support for functions such as influence of an application on network traffic routing, Network Capability Exposure access, interworking with the policy framework for policy control, etc.).

The (R)AN 870 refers to new radio access networks that support both evolved E-UTRA (E-UTRA), which is an evolved version of 4G radio access technology, and New Radio (NR) (e.g., gNB).

The UPF 880 delivers a downlink PDU received from the DN 890 to the UE 860 via the (R)AN 870 and delivers an uplink PDU received from the UE 860 to the DN 890 via the (R)AN 870.

Specifically, the UPF 880 may support functions such as an anchor point for intra/inter RAT mobility, an external PDU session point of interconnect to the DN, a user plane part of packet routing and forwarding, packet inspection and policy rule enforcement, an uplink classifier for supporting lawful intercept, traffic usage reporting, and routing of a traffic flow to the DN, a branching point to support a multi-homed PDU session, QoS handling for user plane (e.g., packet filtering, gating, uplink/downlink rate enforcement), uplink traffic verification (SDF mapping between the Service Data Flow (SDF) and the QoS flow), transport level packet marking within uplink and downlink, downlink packet buffering, and triggering of downlink data notification. Some or all of the functions of the UPF 880 may be supported within a single instance of one UPF.

The DN 890 may refer to, for example, an operator service, an Internet connection, or a third party service. The DN may transmit a downlink Protocol Data Unit (PDU) to the UPF 880 or receive a PDU transmitted from the UE 860 from the UPF 880.

The gNB may support functions such as functions for radio resource management (i.e., radio bearer control, radio admission control, connection mobility control, dynamic allocation (i.e., scheduling) of resources to the UE 860 on uplink/downlink), Internet Protocol (IP) header compression, encryption and integrity protection of a user data stream, selection of the AMF 820 upon attachment of the UE 860 when routing to the AMF 820 is not determined from information provided to the UE 860, routing of user plane data to the UPF(s) 880, routing of control plane information to the AMF 820, connection setup and releaser, scheduling and transmission of paging messages (generated from the AFM 820), scheduling and transmission of system broadcast information (generated from the AMF 820 or from operating and maintenance (O&M)), measurement and measurement reporting configuration for mobility and scheduling, transport level packet marking on uplink, session management, support for network slicing, QoS flow management and mapping to data radio bearers, support for a UE which is in an inactive mode, distribution of a NAS message, NAS node selection, and radio access network sharing, dual connectivity, and tight interworking between NR and E-UTRA.

Although the Unstructured Data Storage Network Function (UDSF), the Structured Data Storage Network Function (SDSF), the Network Exposure Function (NEF), and the NF Repository Function (NRF) are not shown in FIG. 8 for simplicity of explanation, all NFs shown in FIG. 8 may interwork with the UDSF, NEF, and NRF as needed.

The NEF may provide a means for securely exposing services and capabilities for, for example, a third party, internal exposure/re-exposure, an application function, and edge computing, provided by 3GPP network functions. The NEF may receive information based on the exposed capability(s) of other network function(s) from the other network function(s). The NEF may store the received information as structured data using a standardized interface to a data storage network function. The stored information may be re-exposed to other network function(s) and application function(s) by the NEF, and used for other purposes such as analysis.

The NRF may support a service discovery function. The NRF may receive an NF discovery request from the NF instance and provide information about a discovered NF instance to the NF instance. In addition, the NRF may maintain available NF instances and the services supported by the instances.

The SDSF may be an optional function to support the function of storing and retrieving information as unstructured data by a predetermined NEF.

The UDSF may be an optional function to support the function of storing and retrieving information as unstructured data by a predetermined NF.

While FIG. 8 illustrates a reference model for a case where the UE 860 accesses one DN 890 through one PDU session for simplicity, but embodiments are not limited thereto. For example, the UE 860 may simultaneously access two data networks (i.e., local and central data networks) through multiple PDU sessions. In this case, two SMFs may be selected for different PDU sessions. Each of the SMFs may have the capability to control both the local UPF and the central UPF in the PDU session. In addition, the UE 860 may simultaneously access two data networks (i.e., local and central data networks) provided within a single PDU session.

Figure 9:
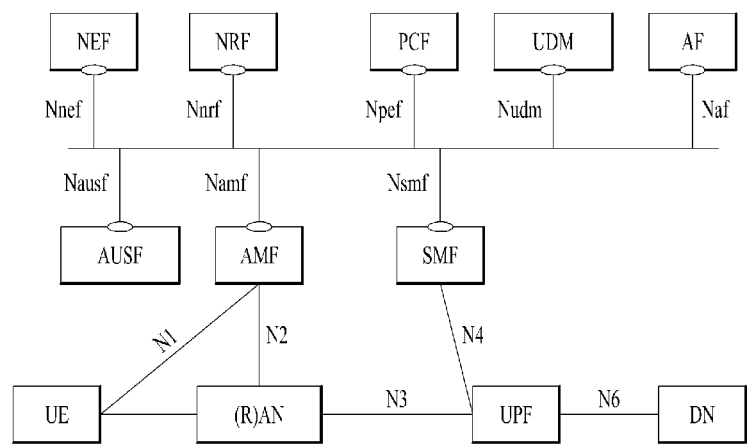
FIG. 9 is a diagram exemplarily illustrating a 5G system architecture using a service-based representation.

FIG. 9 is a diagram exemplarily illustrating a 5G system architecture using a service-based representation.

Referring to FIG. 9, a service-based interface represents a set of services provided/exposed by a predetermined NF. Examples of the service-based interface included in the 5G system architecture are given below.

Namf: a service-based interface exhibited by the AMF
Nsmf: a service-based interface exhibited by the SMF
Nnef: a service-based interface exhibited by the NEF
Npcf: a service-based interface exhibited by the PCF
Nudm: a service-based interface exhibited by the UDM
Naf: a service-based interface exhibited by the AF
Nnrf: a service-based interface exhibited by the NRF
Nausf: a service-based interface exhibited by the AUSF An NF service is a kind of capability exposed by an NF (i.e., an NF service provider) to another NF (i.e., an NF service consumer) via a service-based interface. An NF may expose one or more NF services. The following criteria may be applied to define NF services:

(1) NF services shall be derived from a flow of information for describing end-to-end functionality;

(2) A complete end-to-end message flow shall be explained by a sequence of NF service invocations; and (3) The NF(s) provide their services via a service-based interface through the following two operations.

i) "Request-response": Control plane NF_B (i.e., the NF service provider) receives a request for provision of a specific NF service (including execution of the operation and/or provision of information) from another control plane NF_A (i.e., the NF service consumer). NF_B responds with an NF service result based on the information provided by NF_A in the request. In order to satisfy the request, the NF_B may consume NF services from other NF(s) in turn. In the request-response mechanism, communication may be performed in a one-to-one manner between two NFs (i.e., the consumer and the provider).

ii) "Subscribe-Notify": Control plane NF_A (i.e., the NF service consumer) subscribes to an NF service provided by another control plane NF_B (i.e., the NF service provider). Multiple control plane NF(s) may subscribe to the same control plane NF service. NF_B notifies the NF(s) of interest subscribed to the NF service of the results of the NF service provided by NF_B. A subscription request from the NF service consumer may include a notification request for a notification triggered by a periodic update or a specific event (e.g., change of requested information, reaching a specific threshold, etc.). This mechanism may also include a case where the NF(s) (e.g., NF_A) implicitly subscribe to a specific notification (e.g., subscription to a notification by a successful registration procedure) without an explicit subscription request.

Figure 10:
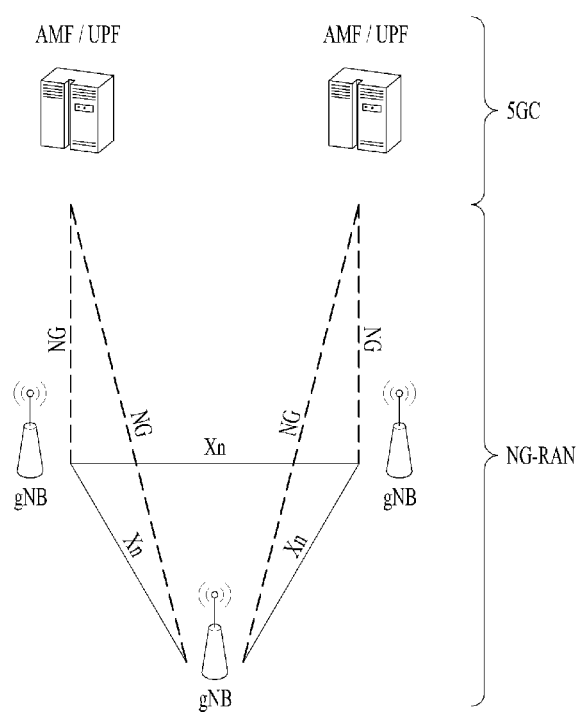
FIG. 10 is a diagram exemplarily illustrating a new generation-radio access network (NG-RAN) structure.

FIG. 10 is a diagram exemplarily illustrating a new generation-radio access network (NG-RAN) structure.

Referring to FIG. 10, the NG-RAN includes NR NodeB(s) (gNB(s)) and/or eNodeB(s) (eNB(s)) providing ends of the user plane and control plane protocols towards the UE.

An Xn interface may be used to connect gNBs to each other or connect gNBs to eNBs connected to 5GC. In addition, the gNBs and eNBs are connected to 5GC using an NG interface. More specifically, the gNBs and eNBs may be connected to the AMF using an NG-C interface (i.e., N2 reference point), which is a control plane interface between NG-RAN and 5GC, and connected to the UPF using a NG-U interface (i.e. N3 reference point), which is a user plane interface between NG-RAN and 5GC.

According to the 3GPP 23.501 standard document, when a PDU session is established, the SMF may determine an area of interest based on the UPF service area. The area of interest may refer to a region in which information about the mobility of the UE is to be received. The area of interest may include, for example, a service area where a service subscribed to by a UE is provided, but is not limited thereto. Information about the area of interest may be transmitted in the form of a tracking area (TA) list or a cell ID list. In addition, when the AMF detects movement of the UE out of the area of interest, it needs to report the changed location of the UE to the SMF.

More specifically, the SMF may subscribe to a "UE mobility event notification" service provided by the AMF. While the SMF is subscribed to the UE mobility event notification service, the SMF may provide an area of interest for the AMF. And when the AMF detects movement of the UE out of the area of interest, it notifies the SMF of the changed location of the UE. The SMF notified of the changed location of the UE by the AMF may determine how to handle the session. For example, the SMF may determine to release the PDU session. Once the PDU session is released, the SMF may cancel subscription to the "UE mobility event notification" service. In addition, the SMF may determine a new area of interest and transmit a new service subscription to the AMF along with the determined new area of interest.

The 3GPP 5G Rel-15 standard has adopted a technology for a Local Area Data Network (LADN) service. LADN, which is a service provided by the serving PLMN of the UE, may refer to a service available only in a specific service area.

According to Section 5.6.5 of the 3GPP TS 23.501 standard document, accessing a DN through a PDU session for LADN is allowed only in a specific LADN service area. The LADN service area refers to a set including a plurality of tracking areas.

To use the LADN Data Network Name (DNN), explicit subscription to a DNN or subscription to a wildcard DNN is required. Whether the DNN corresponds to an LADN service may be an attribute of the DNN, and the UE may be configured to recognize whether the DNN is an LADN DNN.

The LADN information may include information about the LADN service area and LADN DNN information, and may be configured in the AMF on a DN-by-DN basis. Thus, the same LADN service area may be configured for different UEs accessing the same LADN regardless of other factors (e.g., the registered areas of the UEs). The LADN information may be provided to the UE by the AMF during the registration procedure of the UE or the configuration update procedure of the UE. The LADN service area information corresponding to each LADN DNN configured in the AMF may include a set of tracking areas belonging to the currently registered area of the UE (i.e., the intersection of the LADN service area and the currently registered area).

The UE may perform the following operation based on the LADN information.

(1) When the UE is located outside the LADN service area: the UE may not be allowed to request activation of an UP connection of a PDU session for the LADN DNN and establish or change a PDU session for the LADN DNN, and may not need to release an existing PDU session for the LADN DNN unless the UE explicitly receives an SM PDU session release request message from the network.

(2) When the UE is located inside the LADN service area: the UE may be allowed to request establishment/change of a PDU session for the LADN DNN and to request activation of an UP connection of an existing PDU session for the LADN DNN.

In addition, the SMF supporting the DNN may be configured with information about whether the DNN is an LADN DNN. The SMF may subscribe to the "UE mobility event notification" for reporting presence of the UE in an area of interest by providing the LADN DNN to the AMF. The AMF may notify the SMF of the presence of the UE in the LADN service area (e.g., IN, OUT, UNKNOWN), and the SMF may perform the following operation based on the notification by the AMF.

(1) When it is notified that the UE is out of the LADN service area ("OUT"), the SMF may immediately release the PDU session. Alternatively, the SMF may enable the user plane connection for the PDU session while maintaining the PDU session, check if the downlink data notification is disabled, and release the PDU session later.

(2) When it is notified that the UE is present in the LADN service area ("IN"), the SMF may check whether the downlink notification is enabled. Then, upon receiving downlink data or data notification from the UPF, the SMF may trigger a service procedure request for the LADN PDU session triggered by the network in order to enable the UP connection.

(3) If it is notified that it is not known whether the UE is present in the LADN service area ("UNKNOWN"), the SMF may check whether downlink data notification is enabled. Then, upon receiving downlink data or data notification from the UPF, the SMF may trigger a service procedure request for the LADN PDU session triggered by the network in order to enable the UP connection.

According to the conventional technology, when a specific UE enters or leaves an area specified by the Presence Reporting Area (PRA) information based on the concept of PRA, the MME may report the location of the UE to the PGW via the SGW such that the location forms the basis of policy and charging. In this case, the UE may not perform a specific operation for the PRA, and, when the UE is in a connected mode, the location of the UE may be recognized and reported with cell granularity. However, when the UE is in an idle mode, the location of the UE may be recognized and reported based on the tracking area update (i.e., a TAI list configured by the MME to track the location of the UE). Thus, when the UE is in the idle mode, it is not easy to report the exact location of the UE.

For the PRA of the EPS, it is necessary to report the exact location of the UE when there is an ongoing service. However, in the 5G system, PDU session handling by the location of the UE even when the UE is in the idle mode has been introduced, and thus it is necessary to recognize the exact location of the UE (for example, leaving or entering a specific area) even when the UE is in the idle mode. When the UE is in the idle mode, a mobility registration update (existing mobility tracking area update) procedure may be used to recognize change in location of the UE, and the AMF may configure a Tracking Area Identity (TAI) list for mobility registration update of the UE based on the mobility pattern of the UE, the subscription information, and the network topology.

As specified in Section 5.6.11 of the 3GPP TS 23.501 standard document, when the AMF is configured to issue a UE location change notification, a registration area may be configured in consideration of an area of interest. However, configuring the registration area in consideration of the area of interest may be disadvantage in that the requirements of the SMF may affect the unique operation of the AMF, from the perspective of decoupling of the current functions and responsibilities of the AMF and the SMF, and therefore may not fit the basis of the 5G systems.

In order to address the above-described issue, it is proposed in the present disclosure that, when a UE location change notification is needed for each PDU session during the idle mode of the UE, the UE location change notification be operated separately from the registration update procedure so as to fit the basis of the 5G system.

Figure 11:
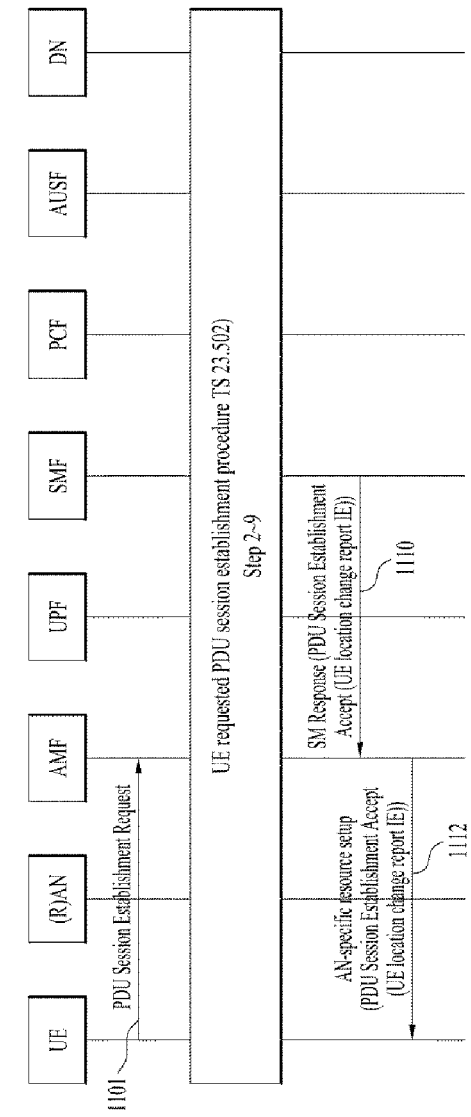
FIG. 11 is a diagram exemplarily illustrating configuration causing a change in location of a UE to be reported to a network node when a PDU session is established according to the present disclosure.

FIG. 11 is a diagram exemplarily illustrating configuration causing a change in location of a UE to be reported to a network node when a PDU session is established according to the present disclosure.

When location tracking of the UE is required for the corresponding PDU session even during the idle mode of the UE, when the corresponding PDU session is valid only in a specific area, or when change in location of the UE (e.g., leaving a specific tracking area or specific cells) is recognized, and thus control of the corresponding PDU session is required, the SMF may transmit, to the UE, a PDU Session Establishment Accept message including a UE location change report Information Element (IE) at the time when a PDU session is established. Accordingly, when the UE enters the idle mode, change in location of the UE may be reported based on the received UE location change report IE. The aforementioned operation may be used together with the UE location change notification, which is specified in Section 5.6.11 of the 3GPP TS 23.501 standard document.

The UE location change report IE may include interested area information, report option, and report gap, which have values valid until the established PDU session is released.

The interested area information may include a tracking area list and a cell identity (ID) list. As described above, the area of interest may be determined based on the UPF service area. For example, the area of interest may include an LADN service area, and the interested area information may include LADN service area information.

The values of the report option may include 0 or 1. When the value of the report option is 0, this may indicate "only move out of the given area." When the value of the report option is 1, this may indicate "Both move in/out of the give area."

The report gap is intended to prevent frequent reporting when the UE moves through a border area, and may have a value between several msec and several sec. During the report gap after previous reporting, the UE may not report the location of the UE even if the movement of the UE is detected. When the location of the UE remains changed after the report gap, the UE may report the change in location of the UE. For example, in the case where the UE reported in the previous reporting that it is located outside an area corresponding to the interested area information, but the UE has moved back into the area corresponding to the interested area information before the report gap, and remains in the area even after the report gap, the UE may report the change in location of the UE. According to an example, reporting the change in the location of the UE may be referred to as issuing a notification of the change in the location of the UE.

Thus, when the situation given after the report gap is the same as the situation in the previous reporting (for example, the UE is located in or out of the area), the UE may not report the change in location of the UE. For example, when a report gap is not given or the value of the report gap is 0, the UE may report the changed location situation of the UE regardless of the report gap (for example, a situation where the UE is located in or out of the area corresponding to the interested area information).

The interested area information may include information about at least one of a plurality of TAs and a plurality of cells, and the area of interest may be operated separately from the registered area of the UE. However, if the conditions for interested area change notification and registration update by mobility are generated together when a UE in the idle mode (e.g., a UE in the CM-IDLE mode) enters a new cell or a new tracking area, the UE may not perform the interested area change notification but perform only the registration update. For example, when the border of the area of interest is the same as the border of the tracking area, the conditions for interested area change notification and registration update by mobility may be generated together. In this case, the UE may assume that the interested area change notification is performed only by performing the registration update, and control the report gap time. For example, even when the UE performs a registration update while leaving or entering the area of interest, the UE may operate the report gap time and may not perform the interested area change notification until the report gap time expires.

Figure 12:
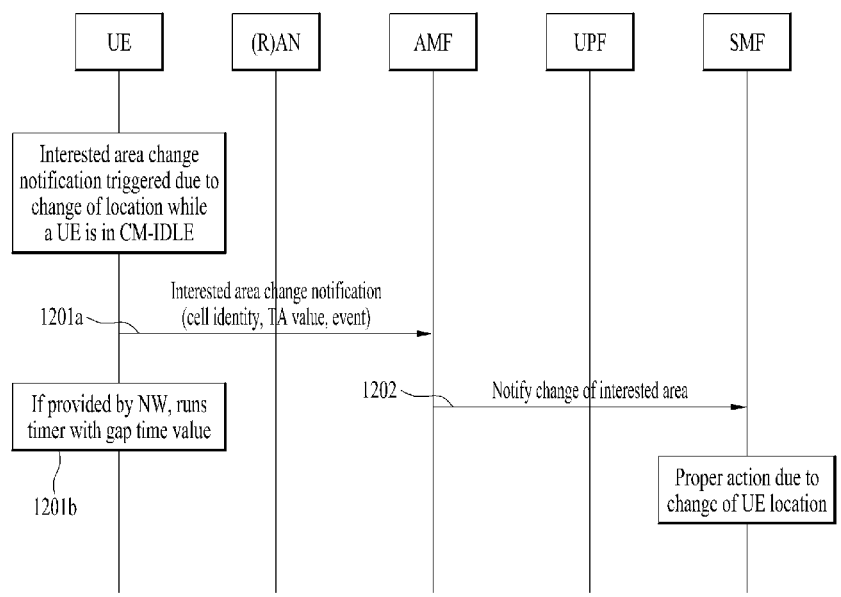
FIG. 12 is a diagram exemplarily illustrating an interested area change notification procedure according to the present disclosure.

FIG. 12 is a diagram exemplarily illustrating an interested area change notification procedure according to the present disclosure.

According to the present disclosure, when the UE pre-receives information (e.g., UE location change report IE) that needs to be reported in establishing and modifying a PDU session from the network, it may detect the location of the UE and perform the interested area change notification before the PDU session is released. In this case, the SMF may subscribe to the UE location change notification service (i.e., UE mobility event notification service) specified in Section 5.6.11 of the 3GPP TS 23.501 standard document.

Referring to FIG. 12, the interested area change notification procedure may be triggered by change in location of a UE that is in an idle mode. The UE may transmit an interested area change notification message to the AMF. Here, the interested area change notification message may include session ID of the corresponding PDU session. The AMF may receive information about change in location of the UE (or UE location change report IE). In the case where the AMF has previously received subscription to the UE location change notification service from the SMF, the AMF may report information about the change in location of the UE to all SMFs which are affected by the information about the change in location of the UE or change of an area of interest. However, in the case where the AMF has not previously received subscription to the UE location change notification service from the SMF, the AMF may report the information about change in location of the UE to the SMF based on the session ID included in the interested area change notification message received from the UE.

The SMF that has received the report on the location change information may release the corresponding PDU session, issue an instruction of buffering off, or issue an instruction of buffering on. In addition, the SMF may recognize that the UE is out of the service area, and may determine UPF relocation and insertion of an intermediate UPF.

In transmitting an interested area change notification message, the UE may not need to include slice negotiation by change of the registered area of the UE, capability negotiation, and Network Slice Selection Assistance Information (NSSAI) for routing in the interested area change notification message, unlike the existing registration update by mobility. Therefore, signaling size and unnecessary negotiation of the UE may be avoided.

The UE location change report information (or UE location change report IE) may be transmitted in a separate Session Management (SM) procedure as well as the PDU establishment procedure. In addition, when the SMF has subscribed to the UE location change notification service, the AMF may give the UE location change report information directly to the UE without directly instruction from the SMF.

Thus, the interested area change notification procedure may be used as a method for tracking the location of the UE separately from the registered area change update procedure. In addition, as the interested area change notification procedure is used, the location of the UE may be tracked through a simpler procedure than the registered area change update procedure.

Figure 13:
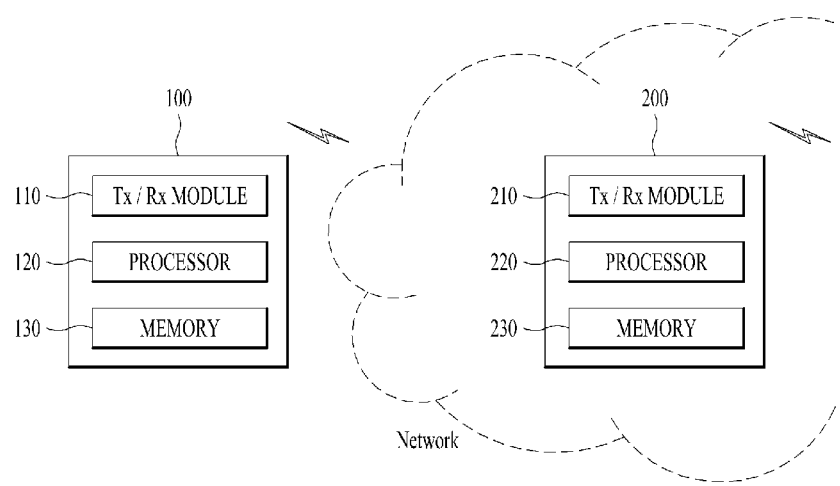
FIG. 13 is a diagram illustrating configuration of a UE and a network node device applied to a proposal of the present disclosure.

FIG. 13 is a block diagram illustrating the configuration of a node device applied to the proposal of the present disclosure.

The UE 100 according to the present disclosure may include a transmission/reception (Tx/Rx) module 110, a processor 120, and a memory 130. The Tx/Rx module 110 of the UE (100) may be referred to as a radio frequency (RF) unit, when communicating with the UE (100). The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 13, the network node 200 according to the present disclosure may include a Tx/Rx module 210, a processor 220 and a memory 230. The Tx/Rx module 210 may be referred to as a transceiver. The Tx/Rx module 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown). In an access network, the network node 200 may be an eNB or a gNB. In a core network, the network node 200 may be a device including a mobility management entity (MME) or an access management function (AMF).

For configuration of the UE 100 and the network node 200, the details described in various examples of the present disclosure may be independently applied or implemented such that two or more examples are simultaneously applied. For simplicity, redundant description is omitted.

The processor 120 of the UE 100 may control the Tx/Rx module 110 to receive information indicating a service area where a data service is provided based on a local area according to the present disclosure, control the Tx/Rx module 110 to receive location change report configuration information for a session of the data service, and report information about change in location of the UE based on the location change report configuration information when the UE enters or leaves the service area while the session is established. Here, the location change report configuration information may include at least one of interested area information, information about a report condition, or information about a report gap. The interested area information may include at least one of a trekking area list and a cell ID list. In addition, the information about change in location of the UE may include information about change of the interested area, which varies as the location of the UE changes.

In the present disclosure, the data service provided based on a local area may include a Location Area data Network (LADN) service, the network node 200 may include an Access and Mobility Function (AMF).

When the location change report configuration information includes information about a report gap, the processor 120 of the UE 100 may not report change in location of the UE 100 when the UE 100 enter or leave the service area for a time set as the report gap. The processor 120 of the UE 100 may report change in location of the UE 100 when the UE 100 still remains in or out of the service area after the time set as the report gap elapses.

In addition, the processor 120 of the UE 100 may control the Tx/Rx module 110 to receive a session establishment accept message for a session establishment request, and the location change report configuration information may be included in the session establishment accept message. In addition, the processor 120 of the UE 100 may control the Tx/Rx module 110 to receive information indicating a service area before a session of the data service is established.

In the present disclosure, the processor 220 of the network node 200 may control the Tx/Rx module 210 to transmit, to the UE, information indicating a service area where a data service is provided based on a local area according to the present disclosure, control the Tx/Rx module 210 to transmit location change report configuration information for a session of the data service to the UE 100, and control the Tx/Rx module 210 to receive information about change in location of the UE 100 based on the location change report configuration information when the UE 100 enters or leaves the service area while the session is established.

The examples of the present disclosure may be implemented through various means. For example, the examples may be implemented by hardware, firmware, software, or a combination thereof.

When implemented by hardware, a method according to examples of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to examples of the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred examples of the present disclosure has been given to enable those skilled in the art to implement and practice the disclosure. Although the disclosure has been described with reference to exemplary embodiments, those skilled in the art will appreciate that various modifications and variations can be made in the present disclosure without departing from the spirit or scope of the disclosure described in the appended claims. Accordingly, the disclosure should not be limited to the specific examples described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP based system. Furthermore, the proposed method is applicable to a millimeter wave (mmWave) communication system using an ultrahigh frequency band.

What is claimed is:

1. A method of reporting, by a User Equipment (UE), location information about the UE to a network node in a wireless communication system, the network node including an access and mobility function (AMF), the method comprising:
    receiving, from the network node, first information related to a service area for providing a data service based on a local area;
    receiving, from the network node, location change report configuration information related to a session of the data service; and
    transmitting, to the network node, second information related to a location change of the UE in an idle state based on the location change report configuration information when the UE enters or leaves the service area while the session is established,
    wherein the second information includes a session ID of the session,
    wherein the second information is transmitted to a session management function (SMF) by the AMF of the network node based on the session ID.

2. The method of claim 1, wherein the location change report configuration information comprises at least one of interested area information, information about a report condition, or information about a report gap.

3. The method of claim 2, wherein the interested area information comprises at least one of a tracking area list and a cell ID list.

4. The method of claim 2, wherein the location change report configuration information comprises information about the report gap, wherein the reporting of the location change of the UE is skipped when the UE enters or leaves the service area for a time set as the report gap.

5. The method of claim 4, wherein the reporting of the location change of the UE is performed when the UE entering or leaving the service area remains in or out of the service area after the time set as the report gap elapses.

6. The method of claim 1, wherein the information about the location change of the UE comprises information about change of an interested area, the interested area varying as a location of the UE changes.

7. The method of claim 1, wherein the data service provided based on the local area comprises a Location Area data Network (LADN) service.

8. The method of claim 1, further comprising:
receiving a session establishment accept message for a session establishment request,
wherein the location change report configuration information is contained in the session establishment accept message.

9. The method of claim 1, wherein the information about the service area is received before the session of the data service is established.

10. The method according to claim 1, wherein the UE is capable of communicating with at least one of another UE, a UE related to an autonomous driving vehicle, a base station and/or a network.

11. A method of receiving by a network node in a wireless communication system, the network node including an access and mobility function (AMF), the method comprising:
transmitting, to the UE, first information related to a service area for providing a data service based on a local area;
transmitting, to the UE, location change report configuration information related to a session of the data service; and
receiving, from the UE, second information related to information related to a location change of the UE in an idle state based on the location change report configuration information when the UE enters or leaves the service area while the session is established,
wherein the second information includes a session ID of the session,
wherein the second information is transmitted to a session management function (SMF) by the AMF of the network node based on the session ID.

12. A User Equipment (UE) in a wireless communication system that includes a network node, the network node including an access and mobility function (AMF), the UE comprising:
a transceiver; and
a processor,
wherein the processor is configured to:
receive, from the network node, first information related to a service area for providing a data service based on a local area;
receive, from the network node, location change report configuration information related to a session of the data service; and
transmit, to the network node, second information related to a location change of the UE in an idle state based on the location change report configuration information when the UE enters or leaves the service area while the session is established,
wherein the second information includes a session ID of the session,
wherein the second information is transmitted to a session management function (SMF) by the AMF of the network node based on the session ID.

13. The UE according to claim 12, wherein the UE is capable of communicating with at least one of another UE, a UE related to an autonomous driving vehicle, a base station and/or a network.

14. A network node in a wireless communication system, the network node including an access and mobility function (AMF) and comprising:
a transceiver; and
a processor,
wherein the processor is configured to:
transmit, to the UE, first information related to a service area for providing a data service based on a local area;
transmit, to the UE, location change report configuration information related to a session of the data service; and
receive, from the UE, second information related to a location change of the UE in an idle state based on the location change report configuration information when the UE enters or leaves the service area while the session is established,
wherein the second information includes a session ID of the session,
wherein the second information is transmitted to a session management function (SMF) by the AMF of the network node based on the session ID.

* * * * *